Figure 1:
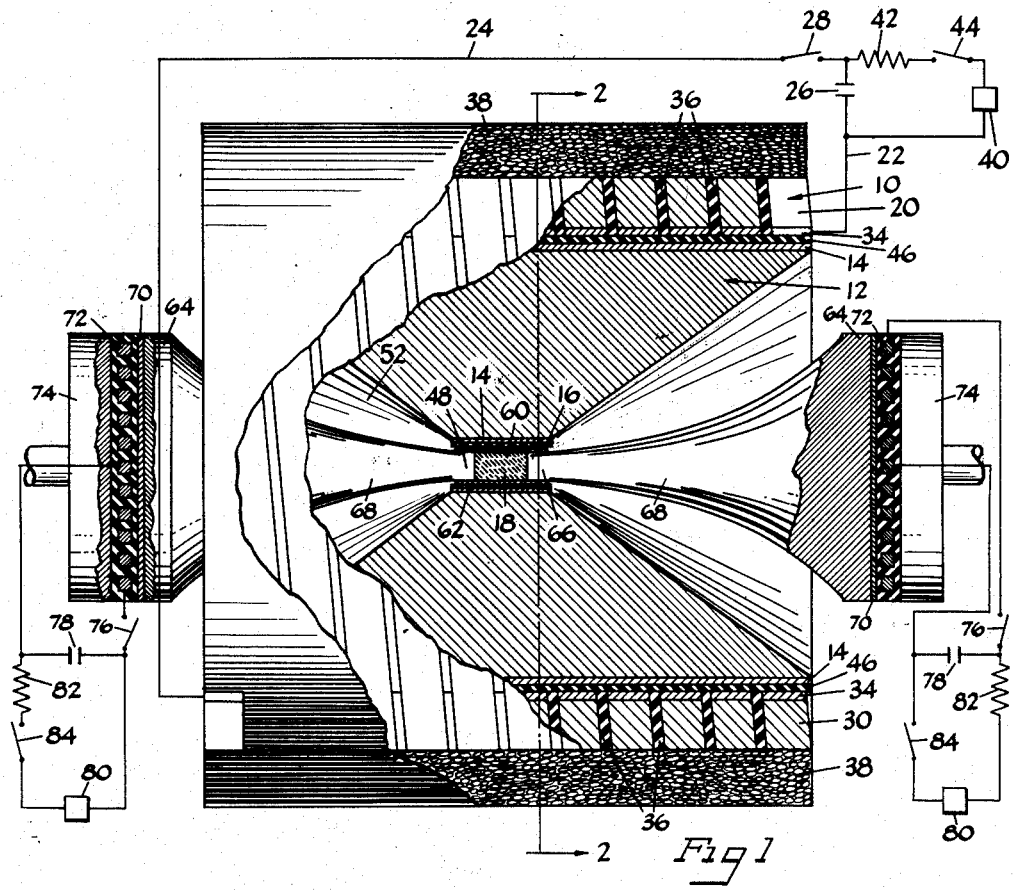

Oct. 29, 1963  G. W. HARVEY ETAL  3,108,325
FORMING DEVICE
Filed Jan. 13, 1961

Inventor's
George W. Harvey
Gerald L. Allen
By Soans, Anderson, Luedeka & Fitch
Atty's United States Patent Office  
3,108,325  
Patented Oct. 29, 1963

3,108,325
FORMING DEVICE
George W. Harvey, San Diego (La Jolla), and Gerald L. Allen, Del Mar, Calif., assignors to General Dynamics Corporation, New York, N.Y., a corporation of Delaware
Filed Jan. 13, 1961, Ser. No. 82,629
6 Claims. (Cl. 18—16.5)

The present invention relates generally to forming devices and, more particularly, to a device in which metallic material may be formed by the energy acquired from a magnetic field.

In a co-pending application, Serial No. 757,867, which was filed on August 28, 1958, and, now Patent No. 2,976,907, is assigned to the assignee of the present invention, a method and apparatus are set forth for forming metal by employing a magnetic field of high flux density. In the described device a magnetic field of high flux density is set up about a shaped conductor by passing a current pulse of high amperage through the conductor. The high-intensity field induces a current in a metal work piece disposed in the magnetic field. The interaction between the high-intensity magnetic field and the magnetic field produced by the induced current in the work piece produces an impulse on the work piece which, when made great enough, forms the metal work piece.

While the devices set forth in the above identified application have proven to be of great practical utility in the forming of metal work pieces, in certain applications a greater force than that provided by such devices is required to form certain metal work pieces.

Accordingly, it is an object of the present invention to provide a magnetic forming device which includes means for increasing the force applied to the metallic material being formed. A further object of the present invention is the provision of means for concentrating the force in a magnetic forming device. Still another object is the provision of a force-concentrating means in a magnetic forming device, which means is durable and efficient in operation and economical to manufacture.

Other objects and advantages of the present invention will become apparent by reference to the following description and accompanying drawings.

Figure 2:
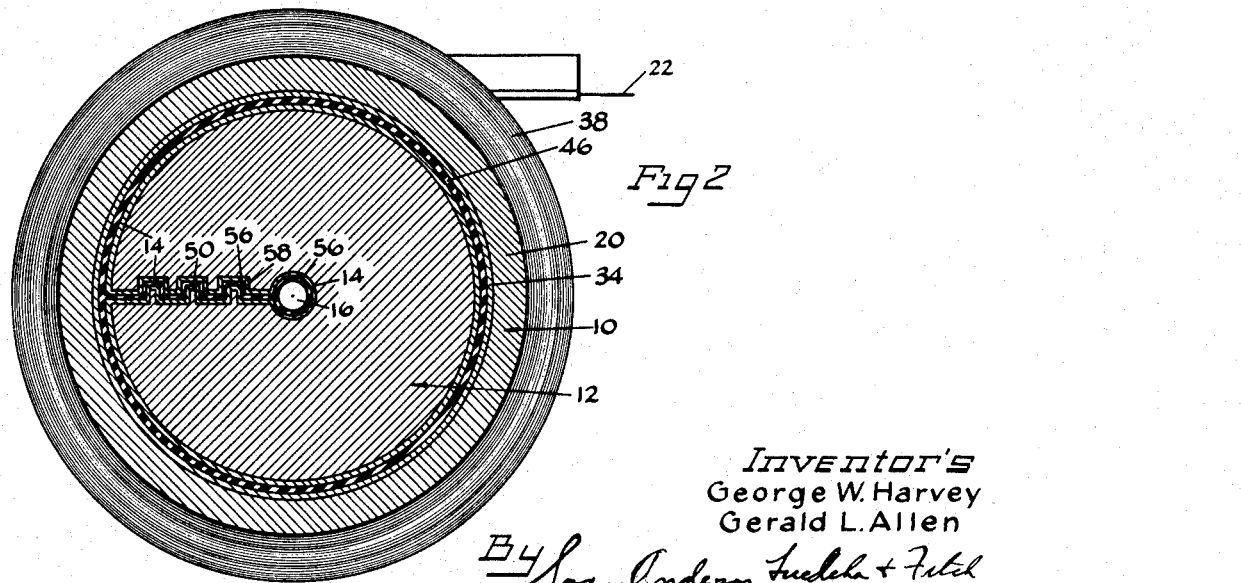

In the drawings:

FIGURE 1 is a schematic side elevational view of a magnetic forming device in accordance with the present invention, with portions of the outer structure of the device being broken away to show the internal construction thereof and with a work piece to be formed disposed in a centrally disposed work space; and FIGURE 2 is a cross-sectional view taken generally along line 2—2 of FIGURE 1, the work piece being removed from the work space.

As shown in the drawings, by the present invention a metal forming device is provided which generally includes means 10 for setting up a high intensity magnetic field, and means 12 for concentrating the force provided by the field. The force concentrating means 12 is disposed in the high-intensity magnetic field and includes a conductive member 14 shaped to provide a continuous conducting surface. A portion of the member 14 is shaped to define a work space 16 of a suitable shape to form a metallic work piece 18 disposed therein in the desired manner.

The high-intensity magnetic field set up in the forming device intersects the conductive member 14, thereby inducing a current therein. The induced current in the member 14, in turn, sets up a high intensity field in the work space 16, which field exerts a sufficient pressure on the metallic work piece to form the work piece 18.

More specifically, in the illustrated embodiment, the means 10 for setting up the high intensity magnetic field includes a coil or solenoid 20 which is connected by conductors 22 and 24 to a source of energy 26, such as a capacitor bank, or a motor generator. Switch means 28, such as an ignitron, thyratron, etc., is connected between the coil 20 and the capacitor bank 26.

The coil 20 is made of sufficient strength to withstand the radial pressure or force produced by the expansion of the high-intensity magnetic field set up within the core of the coil 20. In the illustrated embodiment, the necessary strength is provided by constructing the coil 20 of a rectangularly shaped member 30 of structural material. Since most structural materials are not of low resistance a layer 34 of low resistance material is provided on the inside surface of the member 30. This layer 34 serves as a low resistance path for the current.

The cross sectional area of the layer 34 is made large enough to provide a very low resistance path for the current. The cross sectional area of the member 30 is made sufficiently large to withstand the radial magnetic pressure. The number of turns in the coil 20 depends upon the desired intensity of the magnetic field in the work space 16, and the time over which the pressure is exerted on the work piece.

The large electrical currents flowing in the conducting portions heat them to high temperatures, and hence the member 30 and the layer 34 are preferably made of high temperature material. For example, the member 30 may be made of steel and the layer 34 may be made of molybdenum. Suitable high temperature, electrical insulation 36 of high mechanical strength is disposed between the adjacent turns of the member 30.

The amount of radial pressure or force that the coil 20 can withstand is increased in the illustrated embodiment by providing a backing 38 for the member 30. A suitable backing 38 is provided by wrapping a high strength, high temperature insulation, such as tensioned monofilament glass fiber, around the outer periphery of the coil 20.

The capacitor bank 26 is charged to a high voltage by a high voltage source 40 connected across the capacitor bank 26. A current limiting resistor 42 and switch means 44 are connected in series with the voltage source 40. The limiting resistor may be eliminated with certain power supplies.

As shown in the drawings, the force concentrating means 12 is generally cylindrical in outline and is disposed in the core of the coil 30 in coaxial relationship therewith. The force concentrating means 12 is maintained in spaced relation to the coil 30, and is insulated therefrom, by an annular insulator 46 of high temperature material. For maximum efficiency the annular space between the concentrating means 12 and the coil 30 is made as small as is consistent with electrical insulation.

The force concentrating means 12 is provided with an axially extending hole 48 which serves as the work space 16. A radially extending slot or gap 50 is provided between the hole 48 and the circumferential surface of the concentrating means 12. A conical shaped recess 52 is provided in each end of the concentrator. Accordingly, the axial length of the work space is shorter than the length of the circumferential surface of the concentrating means 12. This affords an increased magnetic field density in the work space.

Because of the forces and temperature involved in the forming device the concentrating means 12 is preferably made of high strength, high temperature material, such as steel, molybdenum, tungsten, aluminum oxide, etc. Since most structural materials are not of low resistance, a low resistance path is provided for the induced current by the conductive member or layer 14. The layer 14 is preferably of high temperature, low resistance material, such as molybdenum, and is disposed on the circumferential surface of the concentrating means 12, on the opposed faces of the radial slot 50, and on the walls of the hole 48.

Suitable high temperature electrical insulation 56 is provided in the slot 50 and on the wall of the hole 48. In order to anchor the insulation 56 in the slot 50, and also in order to minimize leakage of the magnetic field from the work space, a series of corresponding convolutions 58, such as those shown in FIGURE 2, are provided in the opposite faces of the slot 50.

The work piece 18 to be formed is disposed in the hole 48. In the illustrated embodiment, the forming device is employed to compress material 60 initially pressed into a sleeve 62 of conductive material, such as aluminum. The material is prevented from expanding in an axial direction by suitable inertial end plugs 64 provided at the ends of the sleeve 62. The end plugs 64 are of relatively heavy material such as steel, or tungsten carbide and each includes a cylindrical portion 66 which fits into the end of the sleeve 62 and an exponential portion 68 connected at the outer end of the cylindrical portion 66.

In the illustrated embodiment, the end plugs 64 are each forced inwardly by the interaction of an additional magnetic field on a coating 70 of conductive material, such as molybdenum, on the flat outer end of the exponential portion 68, the exponential shape providing an efficient transmission of the pressure wave through the end plug. The field is established by a flat spirally wrapped coil 72 of conductive material which is supported in parallel relation to the coating 70 by a suitable support 74. The coil 72 is connected through switch means 76, such as an ignition, thyratron, etc., to an energy storage means 78 such as a capacitor bank. Energy supplied by a high voltage source 80 is stored in the capacitor bank 78. The high voltage source 80 is connected through a current limiting resistor 82 and a switch means 84 to the capacitor bank 78. The current limiting resistor may be eliminated with certain power supplies.

Prior to the forming operation, the coils 72 may be excited a few times to heat the material 60 which is in contact with the end plugs 64 by sonic or ultrasonic absorption.

For maximum efficiency, the energy stored in source 26, and the resistance and inductance of the coil are such that the desired magnetic field is set up in a time short compared with the time it takes the magnetic field to decay. Preferably the desired magnetic field is set up in less than about 20 microseconds.

In operation, the capacitor bank 26 is charged by closing the switch 44. After the capacitor bank 26 is charged, switch 44 is opened and switch means 28 is closed whereby a high amperage current flows through the coil 20. A high intensity field is set up around the coil 20 and this field intersects the current carrying layer 34 on the concentrating means 12 and induces a current therein. The induced current flowing through the current carrying layer on the wall of the hole 48, in turn, sets up a high intensity field in the work space 16. This field acts on the sleeve 62 to reduce the diameter of the sleeve and thereby compresses the material therein. Switch means 76 are closed at the same time as switch means 28 thereby forcing the end plugs 64 inwardly.

The magnetic pressure within the work space besides acting on the sleeve also acts on the wall of the work space 16 and tends to expand the force concentrating means 12. This tendency of the force concentrating means to expand is counteracted by the magnetic pressure which simultaneously exists between the force concentrating means 12 and the coil 20. Such a simultaneity of forces permits a greater force to be exerted by the forming device without failure of the structure.

In one illustrated embodiment, the coil includes 5 turns of a rectangularly shaped steel member ⅜ inch thick and ⅜ inch wide. The dimensions of the core of the coil are 3 inches long and 2 inches in diameter. The member is provided with a molybdenum current carrying layer .063 inch thick. The concentrating means is composed of steel and is 3 inches in length and 1 and 29/32 inches in diameter. The current carrying layer of the concentrating means is of molybdenum and the layer is .063 inch thick. The work space is ½ inch long and ½ inch in diameter. The work piece includes an aluminum sleeve which has an internal diameter of ⅜ inch and an external diameter of 7/16 inch and is 1 inch long. A quantity of powdered material is initially pressed into the sleeve to about 90 percent of its maximum theoretical density. A current pulse of 130,000 amperes is then passed through the coil and this induces a current of approximately 500,000 amperes in the current carrying layer on the concentrating means. This current produces a field of 500,000 gauss in the work space at the surface of the work piece. The internal diameter of the sleeve is reduced by approximately .06 inch and the density of the material within the sleeve is increased to about 98 percent of its theoretical density.

The size and shape of the work space depends upon the initial and desired final shape of the work piece. Suitable dies may also be provided in the work space. Moreover, the work space may be so designed that, by inversion (i.e., the magnet field is applied to the inside surface of a hollow work piece), the metal is expanded rather than compressed by the magnetic field. In addition, the work space may be spaced from the core of the coil (e.g. the flux concentrator would be formed so that the work space is spaced axially relative to the coil so as to be outside the boundaries of the coil).

The force concentrating means may be made of such a diameter that it can be very easily slipped out of the core of the coil and be replaced with a force concentrating means having a different size and/or shape of work space.

As can be seen from the above, the force concentrating means serves to increase the intensity of the magnetic field that can be provided by a given source of energy. This is accomplished by employing a plurality of turns in the coil and one turn in the force concentrating means. The field intensity is further increased by making the length of the current carrying layer in the work space smaller than the length of the current carrying layer in the circumferential surface of the force concentrating means. However, certain benefits of this invention are obtained by making the work space the same length as the circumferential surface and/or employing one turn in the coil.

The above described construction of the magnetic forming device provides great mechanical strength, and a more or less uniform stress gradient in the materials employed in the construction thereby permitting best use of all the structural materials. Also, the described construction is relatively inexpensive, and simple to manufacture.

Various other changes and modifications may be made in the above described forming device without deviating from the spirit or scope of the present invention.

Various features of the invention are set forth in the accompanying claims.

What is claimed is:

1. A magnetic forming device comprising a coil, a capacitor bank, means connected to said capacitor bank for charging the same, means for selectively connecting said capacitor bank to said coil, and a cylindrical member of conductive material disposed in coaxial relationship with said coil, said member having an axially extending aperture therein and a radially extending slot between the external surface thereof and the aperture, the charge stored in said capacity bank being sufficient to set up a magnetic field in the aperture which is of a sufficient intensity to form a work piece disposed therein in the desired manner.

2. A magnetic forming device comprising a coil having a plurality of turns, a capacitor bank, means connected to said capacitor bank for charging the same, means for selectively connecting said capacitor bank to said coil, and a cylindrical member of conductive material disposed in said coil in coaxial relationship therewith, said member defining therein a work space of a predetermined shape, and having a slot extending between the circumferential surface of said member and said work space, said member being of such diameter that it may be easily removed from said coil, the charge stored in said capacitor bank being of such a magnitude that the magnetic field set up in the work space is of sufficient intensity to form a work piece disposed therein in the desired manner.

3. A magnetic forming device comprising a coil, a capacitor bank, means connected to said capacitor bank for charging the same, means for selectively connecting said capacitor bank to said coil, and a cylindrical member of conductive material disposed in said coil in coaxial relationship therewith, said member having an axially extending aperture therein, and a radially extending slot extending between the circumferential surface of said member and the aperture, the axial length of said aperture being smaller than the length of the circumferential surface of said member, the charge stored in said capacitor bank being of such a magnitude that a sufficiently intense field is set up in the aperture to form a work piece disposed therein in the desired manner.

4. A magnetic forming device comprising a coil having a plurality of turns, a capacitor bank, means connected to said capacitor bank for charging the same, means for selectively connecting said capacitor bank to said coil, said coil having an outer layer of high temperature, structural material and an inner layer of high temperature, conductive material, a cylindrical member disposed in said coil in coaxial relationship therewith, said member having an axially extending cylindrical work space therein, and a radially extending slot between said work space and the circumferential surface of said member, and a continuous layer of high temperature, conductive material on the circumferential surface of said member, on the opposed faces of said slot, and on the wall of said work space, the axial length of said work space being smaller than the length of the circumferential surface of said member, the charge stored in said capacitor bank and the resistance and inductance of the coil being such that a field is set up in said work space in a time short compared with the time that it takes for the field to decay.

5. A magnetic forming device comprising a cylindrical coil having a plurality of turns, a capacitor bank, means connected to said capacitor bank for charging the same, means for selectively connecting said capacitor bank to said coil thereby establishing a magnetic field, and a conductive member including a first generally cylindrical surface portion disposed adjacent to and in concentric relationship with said coil, and a second surface portion electrically interconnected in series with said first surface portion and having a magnetic field producing area including a work receiving space of a shape such that the magnetic field set up in said space by current induced in said member by said first mentioned magnetic field has a predetermined configuration at the surface of a metallic substance disposed in said work space, the charge stored in said capacitor bank being of such magnitude that a sufficiently intense field is set up in the work space to form the metallic substance disposed therein.

6. A magnetic forming device comprising a capacitor bank, means connected to said capacitor bank for charging the same, a cylindrical coil, means for coupling said coil to said capacitor bank whereby said coil serves as a source of magnetomotive force, and a member having a first electrically conductive generally cylindrical surface portion disposed in adjacent relation to and concentric with said coil, a second electrically conductive surface portion spaced from said first conductive surface portion and at least partially defining a work space of a predetermined shape, and an intermediate electrically conductive surface portion electrically coupling said first and said second electrically conductive surface portions in series whereby flux produced by said magnetomotive force is guided into a predetermined configuration at the surface of a conductive work piece positioned in the work space, the charge stored in said capacitor bank being sufficient to establish a magnetic field in the work space which forms the work piece.

References Cited in the file of this patent

UNITED STATES PATENTS

| | | |
|---|---|---|
| 2,481,071 | Bowlus | Sept. 6, 1949 |
| 2,509,713 | Achard | May 30, 1950 |
| 2,537,289 | Van Embden | Jan. 9, 1951 |
| 2,941,244 | Wentorf | June 21, 1960 |
| 2,976,907 | Harvey et al. | Mar. 27, 1961 |